United States Patent [19]

Giacomelli

[11] Patent Number: 4,592,629

[45] Date of Patent: Jun. 3, 1986

[54] EYEGLASS FRAMES WITH METALLIC STRIP REINFORCEMENT TRAVERSED BY HINGE ATTACHMENT SCREWS

[75] Inventor: Renato Giacomelli, Piano di Follo, Italy

[73] Assignee: Morwen s.r.l., Piano di Follo, Italy

[21] Appl. No.: 412,294

[22] Filed: Aug. 27, 1982

Related U.S. Application Data

[62] Division of Ser. No. 121,443, Feb. 14, 1980, Pat. No. 4,443,074.

[30] Foreign Application Priority Data

May 3, 1979 [IT] Italy .............................. 21494/79[U]
Jun. 20, 1979 [IT] Italy .............................. 23751 A/79

[51] Int. Cl.⁴ .......................... G02C 1/08; G02C 5/12
[52] U.S. Cl. ........................................ 351/41; 351/95; 351/137; 351/153
[58] Field of Search ................. 351/41, 178, 159, 153, 351/121, 95, 137

[56] References Cited

U.S. PATENT DOCUMENTS

| | | | |
|---|---|---|---|
| 1,568,629 | 1/1926 | Schumacher et al. | 351/178 X |
| 2,997,917 | 8/1961 | Baer | 351/178 X |
| 4,190,333 | 2/1980 | Lambert | 351/153 X |
| 4,222,640 | 9/1980 | Bononi | 351/41 X |

*Primary Examiner*—John K. Corbin
*Assistant Examiner*—Scott J. Sugarman
*Attorney, Agent, or Firm*—Karl F. Ross; Herbert Dubno

[57] ABSTRACT

Eyeglass frames are produced from reinforced plastic (synthetic resin) material in the form of plastic plates which are provided with a groove of predetermined configuration receiving a metallic reinforcing blade. When the groove is sealed, the blade extends across a bridge piece adapted to the position above the bridge of the nose of the user and around windows receiving lenses for the eyeglasses.

5 Claims, 31 Drawing Figures

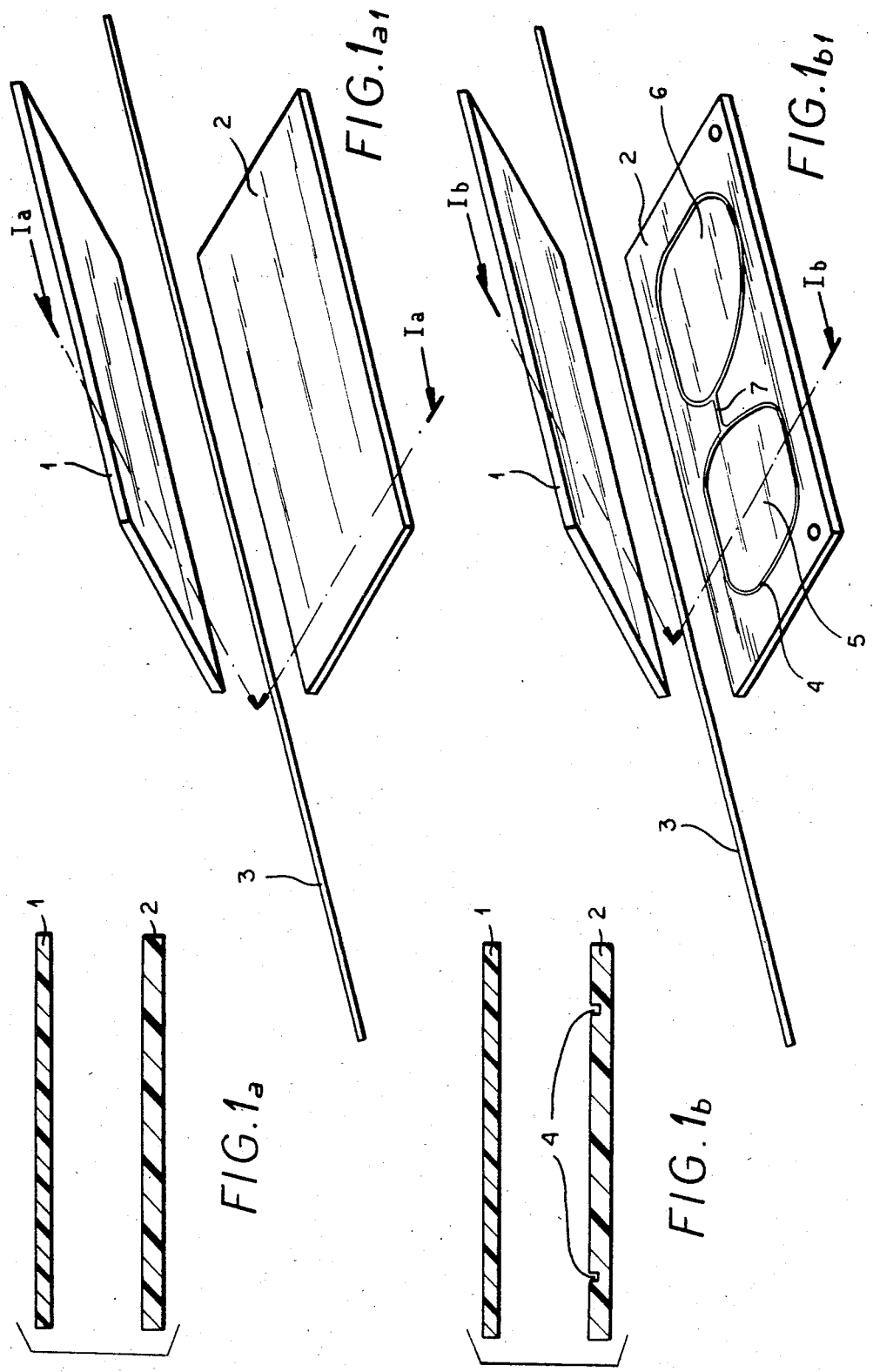

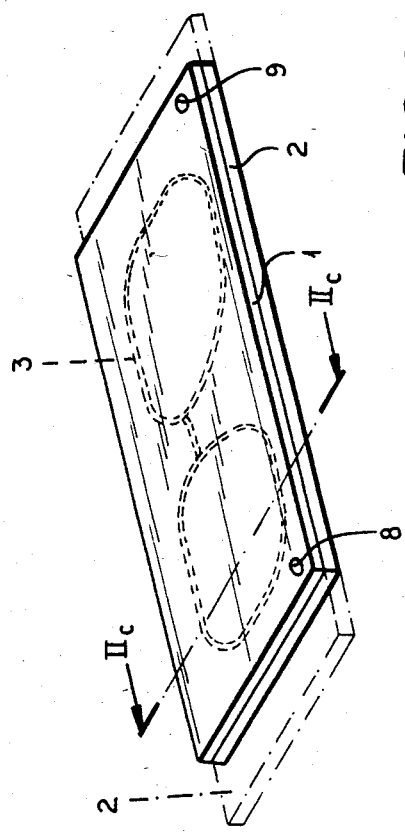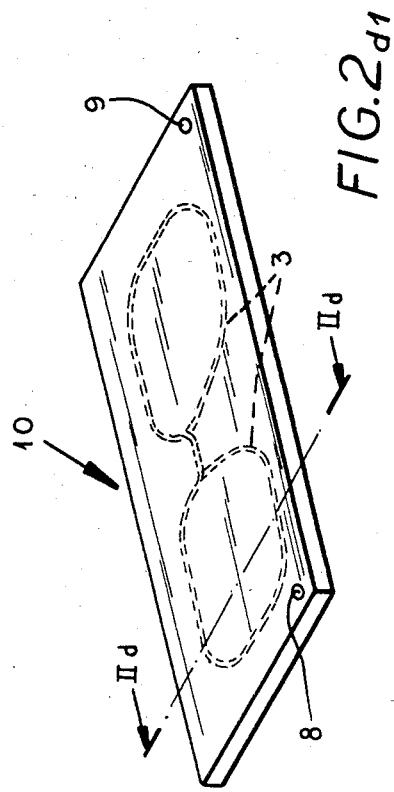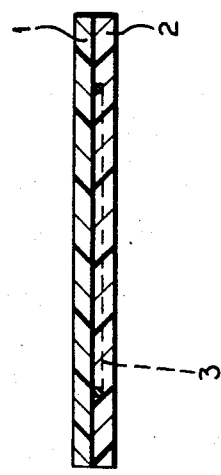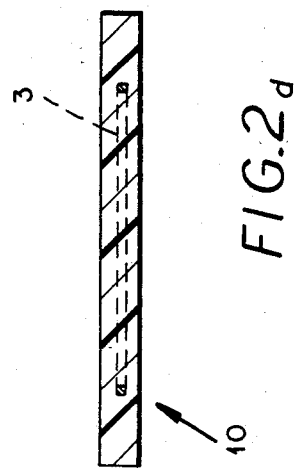

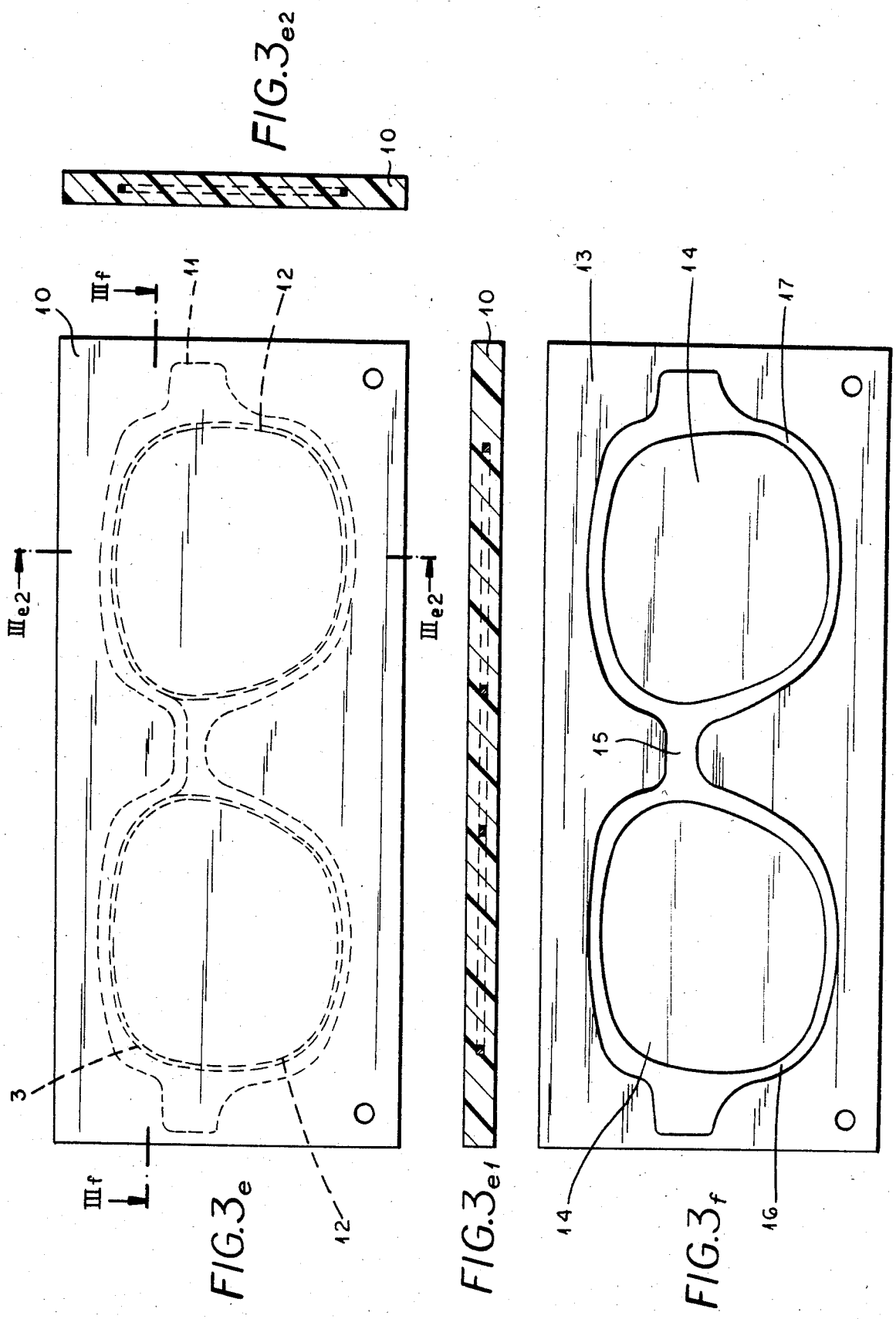

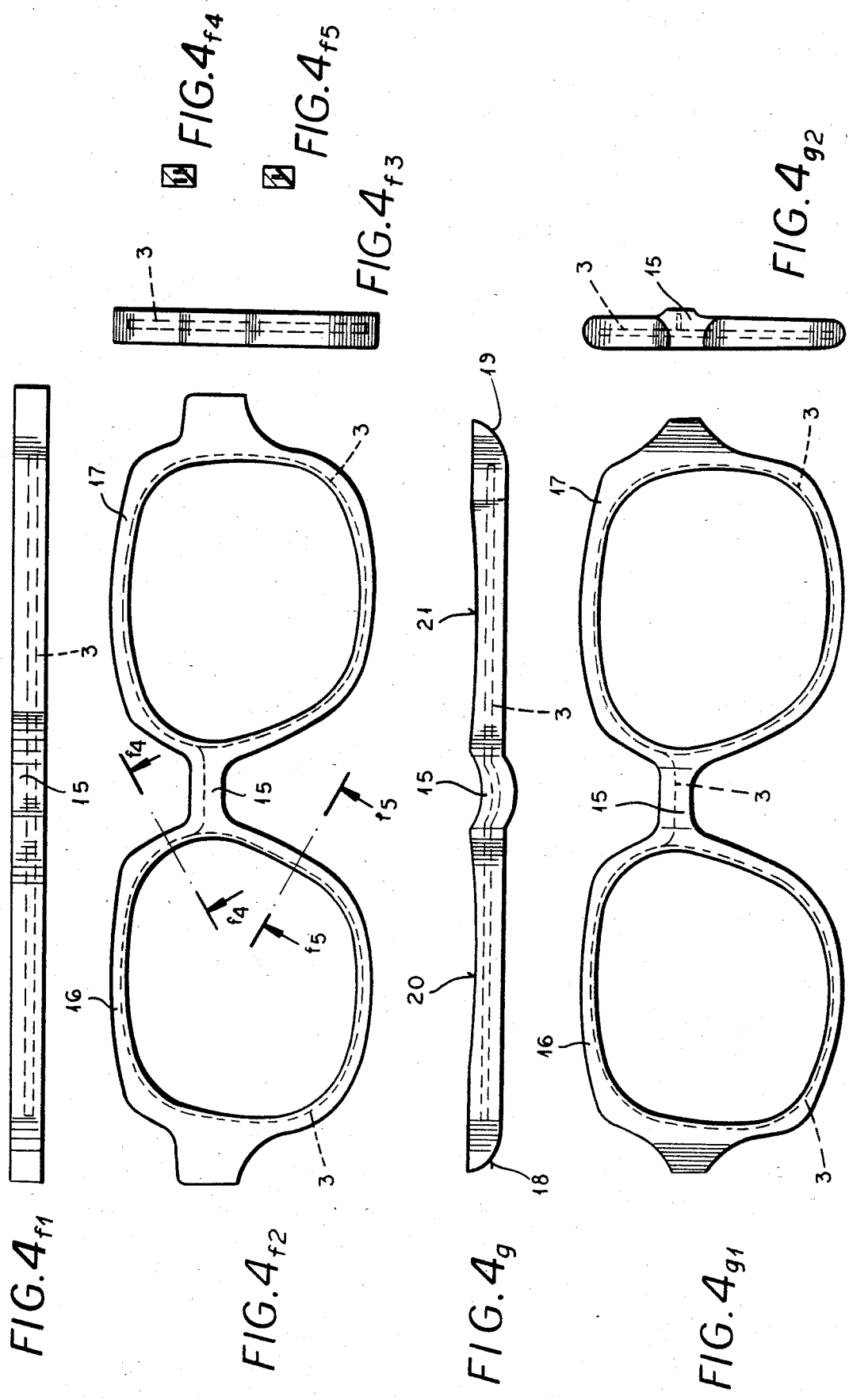

4,592,629

EYEGLASS FRAMES WITH METALLIC STRIP REINFORCEMENT TRAVERSED BY HINGE ATTACHMENT SCREWS

CROSS REFERENCE TO RELATED APPLICATION

This application is a division of Ser. No. 121,443 filed Feb. 14, 1980, (now U.S. Pat. No. 4,443,074 issued Apr. 17, 1984).

FIELD OF THE INVENTION

The present invention relates to eyeglass frames and, more particularly, to eyeglass or spectacle frames composed of at least one and possibly two plates of plastic (synthetic resin) material provided with metallic reinforcement.

BACKGROUND OF THE INVENTION

Several methods are known for making plastic eyeglass frames whose front portion is strengthened or reinforced interternally by a continuous metal blade member embedded in part of the thickness of the frame and extending around the glass-holding seats or windows and across the nose-bridging portion.

These earlier methods are not completely satisfactory. The reason for this is that in the earlier methods of embedding the metal blade in the plastic body, special and intricate techniques were required, along with the use of specifically designed tools, clamping devices and the like. These resulted in high cost, long machining times and low outputs.

In addition, eyeglass or spectacle frames could not be easily produced to accommodate adjustable and swinging nose-engaging elements, nor was it possible to provide eyeglass frames for a broad range of nose, sizes and shape.

Another disadvantage of the earlier systems was that they were unable to provide eyeglass frames of a high flexibility. As a result it was difficult to mount the lenses and to lock them in place.

OBJECTS OF THE INVENTION

The principal object of the present invention is to provide a reinforced eyeglass or spectacle frame of comparatively low cost and which can be fabricated in a practical, simple and effective manner without special and intricate equipment.

Another object of this invention is to provide an internally reinforced eyeglass frame which can be fabricated from suitable synthetic resin material in plates or injection molded bodies.

It is also an object of this invention to provide eyeglass frames which can be easily fitted to a broad range of nose size and shape.

Still another object of this invention is to provide an improved eyeglass frame characterized by high flexibility to allow mounting of the lenses to be simplified and accomplished without special tools.

SUMMARY OF THE INVENTION

An eyeglass frame according to the invention comprises at least one plate of plastic (synthetic resin) material formed with a pair of lens-receiving windows interconnected by a bridge piece and provided with a continuous groove open at at least one surface of the plate, the groove corresponding in shape and size to the predetermined frame configuration and running around the boundaries of the lens-receiving openings and across the bridge piece. A metallic reinforcing member is received in the groove and the groove is sealed so as to embed and permanently fix the metallic reinforcing member therein. When the plate is cut around the configuration adjacent the metallic reinforcing member, the frame is formed.

An eyeglass frame of the invention can comprise two substantially coextensive plates, sealed together and having a pair of spaced apart windows adapted to receive lenses, at least one of the plates having a groove opening towards the other plate and closed thereby. The groove can extend around the windows and across a bridge member adapted to be positioned above the bridge of the nose of the user and disposed between the window.

The reinforcing metallic member is received in the groove and held and sealed therein by the other plate.

The groove receiving the reinforcing member can open toward the interiors of the windows along the peripheries thereof, and an insert can be received in the groove for sealing same.

The connection of the member to the plates at the bridging portion can be such as to permit a slight sliding in order not to obstruct the expansion of the windows as lenses are mounted therein.

The eyeglass frame can also comprise a single piece of plastic material forming the frame front portion and provided with lens-receiving windows and a nose-bridging member between the windows, a continuous metallic reinforcing member received in the body and extending around the windows and in the nose-bridging member, headed pins being mounted on the reinforcing member in the region of the nose-bridging member and projecting from the plastic material of the body, and nose-bearing pads swingably mounted on the pins.

The body can be formed with a continuous groove receiving said reinforcing member.

The reinforcing member can be interrupted at at least one hinge forming portion of the body at an end thereof, the ends of the reinforcing member at the interruption being bent and connected to one another by a screw, the connection being effective to lock a fixed portion of a hinge to the frame front portion.

The plastic material of the body can be provided with a projection for receiving a hinge and split into two portions which, upon interconnection by a screw, hold the lens in the respective window.

BRIEF DESCRIPTION OF THE DRAWING

The above and other objects, features and advantages of the invention will become more readily apparent from the following description, reference being made to the accompanying drawing, in which:

FIG. $1_a$ is a sectional view taken along line $I_a$—$I_a$ of FIG. $1_{a1}$ which is a perspective view showing the main elements forming an eyeglass frame front portion according to a first embodiment of the invention;

Figure 5:
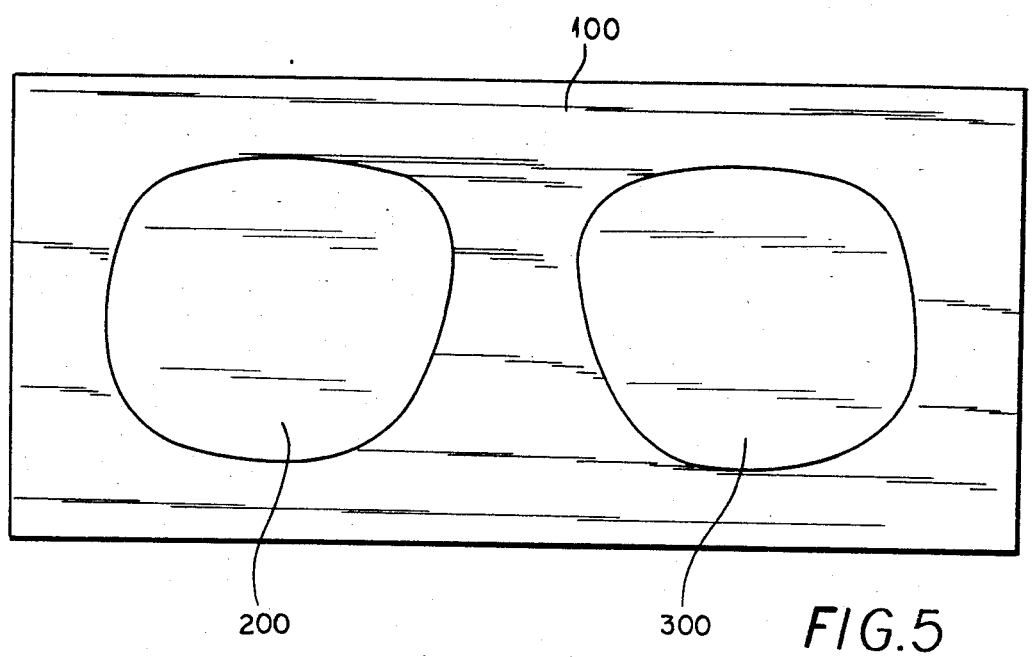
Figure 6:
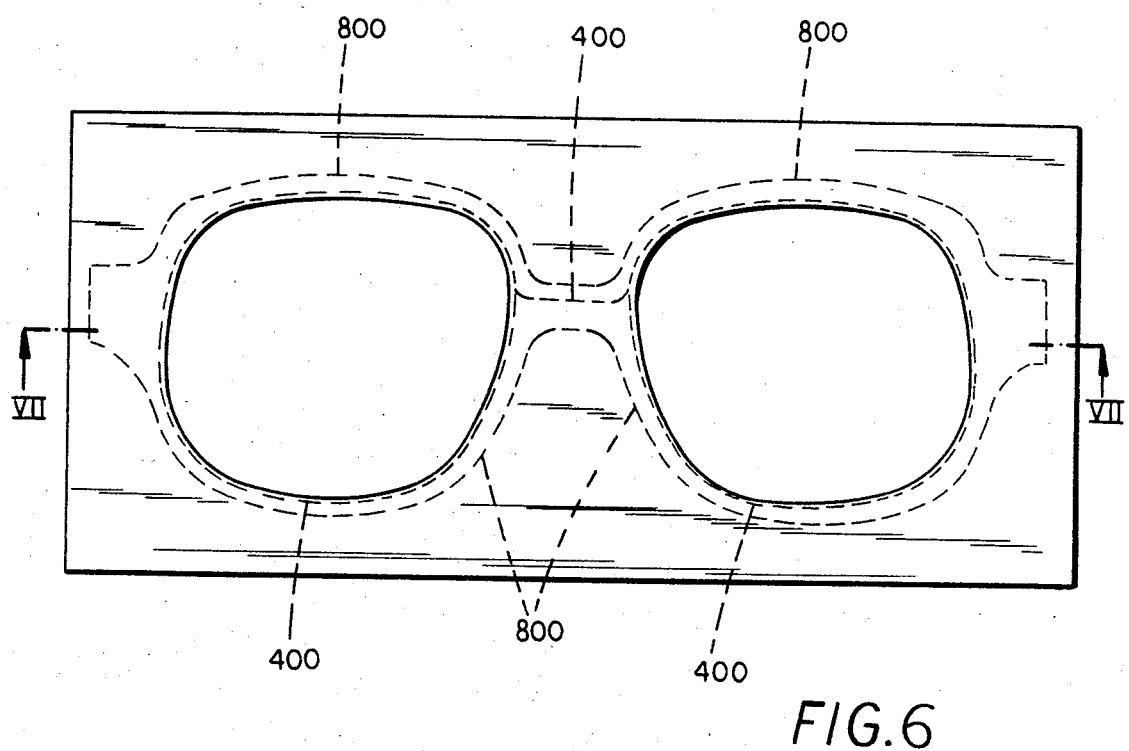
Figure 7:
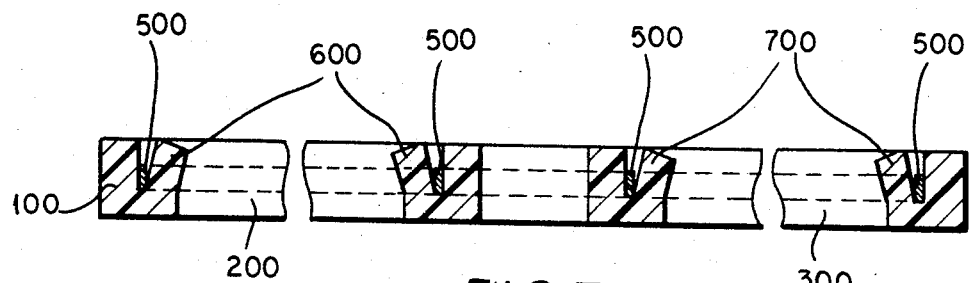
Figure 8:
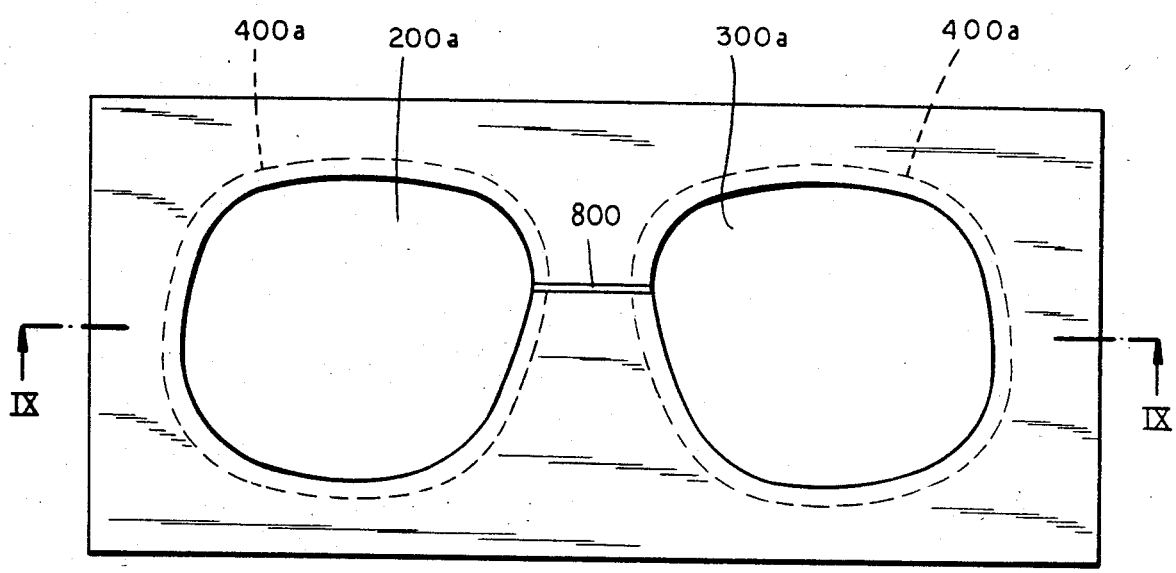
Figure 9:
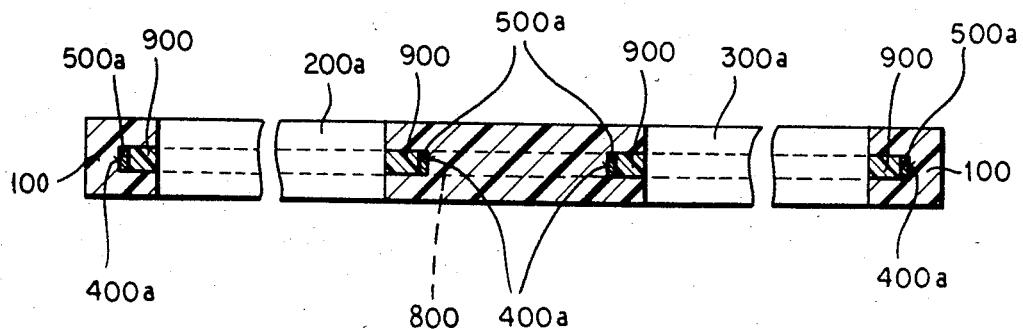
Figure 10:
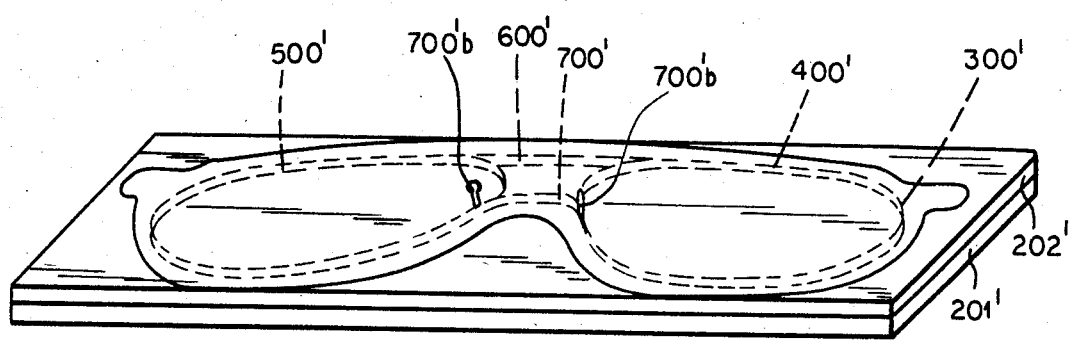
Figure 12:
Figure 11A:
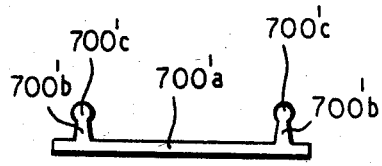
Figure 11B:
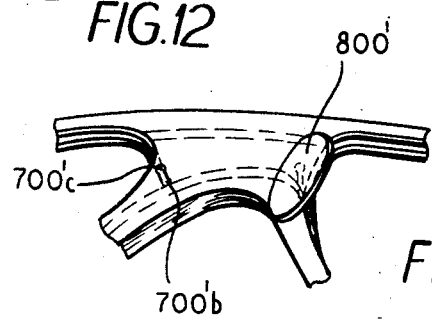
Figure 13:
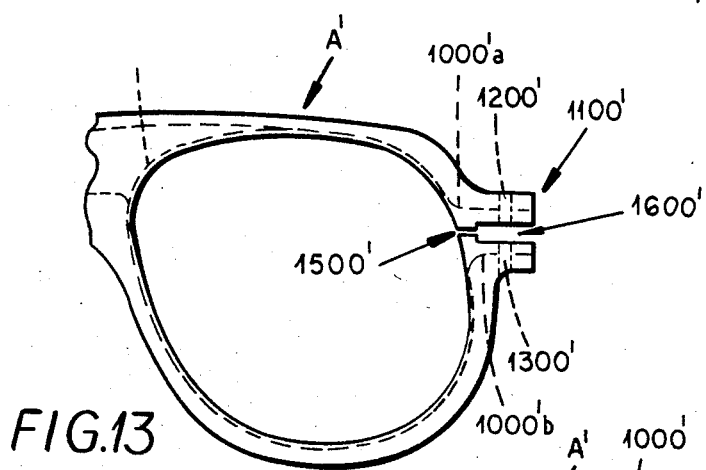
Figure 14:
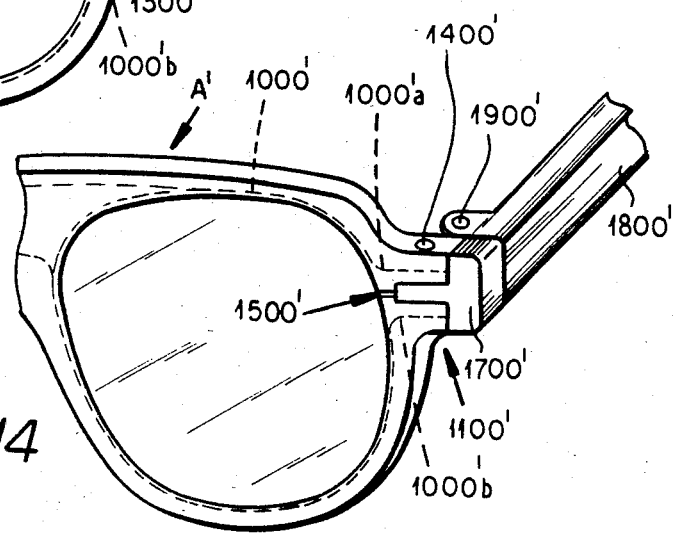

FIG. $1_b$ is a sectional view taken along line $I_b$—$I_b$ of FIG. $1_{b1}$, which is a perspective view showing the groove formed in one plate and provided for housing the reinforcing blade or member;

FIG. $2_c$ is a sectional view taken along line $II_c$—$II_c$ of FIG. $2_{c1}$, which is a perspective view showing the elements superimposed on one another;

FIG. $2_d$ is a sectional view taken along line $II_d$—$II_d$ of FIG. $2_{d1}$, which is a perspective view showing the elements coupled to one another by a sealing operation or the like;

FIG. 3$_e$ is a front elevational view showing a perimetral scribing operation for the eyeglass frame front portion;

FIGS. 3$_{e1}$ and 3$_{e2}$ are sectional views taken respectively along lines III$_f$—III$_f$ and III$_{e2}$—III$_{e2}$ of FIG. 3$_e$;

FIG. 3$_f$ is a front elevational view of the eyeglass front portion showing a subsequent scribing operation prior to punching or milling;

FIGS. 4$_{f1}$, 4$_{f2}$ and 4$_{f3}$ are respectively top, front and side views showing completing and finishing steps in the fabrication of the eyeglass frame;

FIGS. 4$_{f3}$ and 4$_{f4}$ are sectional views taken respectively along lines f$_4$—f$_4$ and f$_5$—f$_5$ of FIG. 4$_{f2}$;

FIGS. 4$_g$, 4$_{g1}$ and 4$_{g2}$ are respectively top, front and side views showing further completing and finishing steps in the fabrication of the eyeglass frame;

FIG. 5 is an elevational view illustrating a plastic plate adapted to be used in the frame making method and in which the lens openings have previously been punched;

FIG. 6 is a similar view showing the scribing lines for insertion of a reinforcing blade or member and the outer profile of the frame;

FIG. 7 is a cross section draw to a larger scale and taken along the line VII—VII of FIG. 6;

FIGS. 8 and 9 are respectively a plan view and a cross sectional view taken along line IX—IX of FIG. 8 illustrating a variation of the steps represented by FIGS. 5-7;

FIG. 10 is a perspective view of an eyeglass frame formed from two plates according to the invention after they have been glued together;

FIGS. 11a and 11b are detailed views illustrating eyeglass frame nose bridge portions provided with nose-abutting pads or the means for securing same; and FIG. 12 is a perspective view showing a pad adapted to be mounted upon the nose-bridging portion of FIGS. 11a and 11b; and FIGS. 13 and 14 are respectively a front elevational view and a perspective view illustrating one side of an eyeglass frame having an interrupted reinforcing member and provided with a screw type clamping arrangement.

SPECIFIC DESCRIPTION

FIGS. 1$_a$, 1$_{a1}$, 1$_b$ and 1$_{b1}$ show an eyeglass frame front portion according to a first embodiment of the invention, obtained by starting from three main elements including two plates 1 and 2 of a suitable plastic material, preferably celluloid, cellulose acetate or the like, and having a size so as to form, upon coupling and punching out or shearing, a complete eyeglass frame front portion. The blade 3 of a metal alloy is effective to provide an internal reinforcing member.

On the plate 2 (FIGS. 1$_b$ and 1$_{b1}$), for example by milling, a continuous groove 4 is formed to extend along a path effective to define the perimeter of the housing or seats 5, 6 for the lenses and the nose-bridging member 7. A metal blade, i.e. the member 3, is inserted in this groove 4.

The reinforcement member is suitably bent and located in such a way that the free ends thereof, as suitably beveled, form a sliding joint without increasing the thickness of the curved portions of the blade or strip at the nose-bridging member.

Upon insertion of the reinforcing blade or member 3, the plates 1 and 2 are glued to one another or thermosealed according to known procedures, thereby providing a single internally reinforced plate (FIG. 2$_c$, or FIG. 2$_d$).

In order to facilitate the gluing operations and subsequent punching operations of the lens-holding openings or rings, the plate 2 (or the opposite one) is of greater size, being possibly provided with centering holes 8-9 effective to pin center the blades on the working table.

FIGS. 2$_d$ and 2$_{d1}$ show the internally reinforced composite plate 10, ready to be subjected to a milling operation for forming the lens-holding openings.

FIG. 3$_e$ illustrates the composite plate 10, as internally ribbed, the dashed lines 11-12 representing, respectively, the outside and inside cutting perimeters at which the milling operation is carried out in order to provide, by removing the scrap 13 and 14 (FIG. 3$_f$), the eyeglass frame when complete, with the nose-bridging member 15 and lens-holding rings 16-17.

Upon removal of the scrap 13 and 14, the eyeglass frame is as represented in FIG. 4$_{f2}$, and the related longitudinal top view FIG. 4$_{f1}$ and side view FIG. 4$_{f3}$; FIGS. 4$_{f4}$ and 4$_{f5}$ are two cross-sectional views taken along the lines f$_4$—f$_4$ and f$_5$—f$_5$ of FIG. 4$_{f2}$ respectively.

FIG. 4$_{g1}$ illustrates that the same eyeglass frame can have its nose-bridging member 15 subjected to a heat-pressure bending operation, and wherein the overall peripheral eyeglass frame zone has been subjected to a milling operation in order to remove the sharp edges and shape the eyeglass frame front portion according to conventional profiles; the finishing millings are carried out at surfaces 18, 19, 20, 21 (FIGS. 4$_{g1}$ and 4$_{g2}$).

It should be noted that the eyeglass frame obtained according to the invention permits, owing to the continuous reinforcing member therein embedded, slight deformation of the eyeglass frame front portion in such a way as to adapt the front eyeglass frame portion to the user needs and to the original configuration in the case of an accidental deformation.

FIGS. 5-9 and, more particularly, FIGS. 5-7, illustrate a further embodiment of the method according to the invention wherein, for forming the eyeglass frame, a single plastic plate 100 is used having a size which can vary according to the desired configuration for the eyeglass frame front portion.

This plate is provided simultaneously by means of a hollow punch, with the corresponding seats for holding the lens (not shown). The same plate 100, by means of a further hollow punch corresponding to the first hollow punch but of greater size, is provided a continuous scribing or groove 400, extending through part of the thickness of the profile of the openings 200 and 300 and all along the nose-bridging member forming zone; this groove is formed with such a depth and size as to enable a reinforcing blade or member 500 (FIG. 7) to be inserted therein.

The cutting edges of the hollow punch used for forming the groove 4 have a wedge profile, from one side, towards the outside with generatrix lines parallel to the axis and, from the inner side, with generatrix lines so slanted as to provide a slight inwardly directed spreading apart of the openings or cavities 200 and 300, of the edges 600 and 700 formed by the cut, thereby facilitating the insertion of the continuous blade 500 into the cut or groove (FIG. 7).

Upon having located the blade 500, the cut zone of the plate 100 is wetted by a solvent capable of softening the portions spread apart by the cut or groove for a subsequent stable gluing operation thereof.

Upon having softened these portions, two solid templates are inserted into the eyelets or openings 200 and 300, said soft templates having a shape like that of the lens-opening, and being provided with a conical projecting portion of a size equal to or slightly greater than that of the eyelets 200-300, so that the templates force the preliminarly softened material outwardly to close the edges 600 and 700 against the other wall of the cut or groove, thereby enclosing the reinforcing blade 500 in the inside of the eyeglass frame.

The cut formed along the nose-bridging member (FIG. 6) is sealed by inserting thereinto a plastic block. Upon having closed the groove 400 and as the solvent is evaporated out, the lens-receiving bevels are formed by carrying out a milling operation along the inside perimeter of the eyelets 200-300; then, by a further milling operation, the outside of the eyeglass frame front portion is cut and shaped, as indicated by the dashed line 800 in FIG. 6.

According to a modification of the instant embodiment, as illustrated in FIGS. 8 and 9, the reinforced eyeglass frame portion is obtained by carrying out of the plate 100, milling operations effective to provide the lens eyelet openings or cavities 200a and 300a (FIG. 8). In this case the continuous groove 400a is obtained by milling the walls of the cavities or openings (FIG. 9) that is by milling at the zone conventionally forming the beveled flanks for the lenses; in this case the groove 400a is formed to a greater depth than the blade in such a way as to permit the reinforcing blade 500a to be inserted to a position set back from the inside perimeter of said cavities 200a and 300a. Then in the nose-bridging member a cross groove 800 is formed, this groove being open at the top and extending as far as the holes 200a-300a. Then into the thus formed grooves the reinforcing blade 500a is inserted and the single plate 100 is immersed into a basin containing an acetone or the like based solvent in order to cause the milled zones to soften. Then the groove 400a beyond the blade 500a is closed, by using a plastic strip or cord 900, preliminarily softened by an acetone based solvent. In the nose-bridging member groove 800 a block of the same material is inserted, sealing the opening.

Then, the plate is inserted into two templates provided with a beveled portion, as previously described, in such a way that the strip is capable of sealing to the wall of the free cavity 400a and, finally, the operations of milling the glass beveled housing, and cutting and shaping by milling of the inside portion of the eyeglass frame front are carried out.

According to this embodiment of the invention complete and reinforced eyeglass frame front portions can be made starting alternatively from eyeglass frame front portions obtained by injection molding, and free from the inner rib of the described operation steps of forming the reinforcing blade housing, sealing to one another the cut portions and forming the beveling for the glasses, both using said greater size hollow punches and by milling the inside of the eye housing (see FIG. 9), also apply.

Referring now to FIGS. 10-14 another embodiment of the eyeglass frame making method will be described, wherein, in addition to the frame, are formed, integral with the reinforcing blade or member, the two pins effective to fix the nose-bearing pads.

More specifically, with reference to FIG. 10, the eyeglass frame is formed starting from two plates 201'-202' made of a plastic material, such as cellulose acetate, celluloid or the like, in one of which by means of a milling operation or the like, a groove 300 having the eyeglass frame shape is formed and comprises, in a continuous way, all the frame portions, i.e. the two glass-holding profiles 400'-500', the connecting member 600' and the nose-bridging member 700', said groove being of such a size as to house a metal blade being manually inserted into said groove all along the perimeter thereof, thereby forming the reinforcing frame for the profiles 400' and 500' and the connecting member 600'.

The blade located in the groove 700' of the nose-bridging member (see FIG. 11a) is provided with a rectilinear portion 700'a the two end portions 700'b thereof being perpendicular to the long portion and being provided with a head 700'c, said blade being inserted into the related groove 700' in such a way that the portions 700'b project outwardly, passing through suitable holes as provided in the covering plate 202' being superimposed on the plate 201' upon inserting the metallic reinforcing member into the related groove and carrying out a gluing step. Then the eyeglass frame is cut from the two plates made integral to one another, in such a way as to permit the portions 700'b to project therefrom.

The portions 700'b form the pin members for the fixing of the swinging pads 800', these latter being provided with bendable hooks 900' (FIGS. 11b and 12) which are bent over the pins 700'b and retained by the provided heads 700'c.

In FIGS. 13 and 14 there is shown a side A' of the already cut eyeglass frame and, in this case, the reinforcing inside member 1000' is interrupted at the projection 1100', the two ends 1000'a-1000'b being bent over parallel to one another. It should be noted that in the parallel portions holes 1200'-1300' are provided one thereof being threaded for engaging the screw 1400' effective to recover the connection between the ends 1000'a-1000'b of the metallic reinforcing member.

The plastic portion 1100' covering and comprising the metallic reinforcing member, is split by a cut or interruption 1500', being provided with a groove 1600' into which is inserted the fixed portion of a hinge 1700' locked to the projecting plastic portion 1100' by the reinforcing member 100' connecting screw 1400'.

The arm 1800' of the glasses supports the other portion of the hinge connected to the fixed portion of the pin 1900'.

It should be noted that this embodiment of the eyeglass frame making method according to the invention provides an eyeglass frame wherein it is possible to insert the glass into the related profile, by unthreading the screw 1400' in such a way as to cause the two sides of the profile to spread apart, owing to the presence of the split 1500'.

Then the glass may be locked in place by tightening screw 1400'.

It should furthermore be noted that it is possible to mount or replace the hinge 1700' or the overall arm of the glasses by screwing off said screw 1400'. It is also possible to easily replace the glass.

Accordingly, the eyeglass frame making method of this embodiment provides an eyeglass frame having a single piece of plastic material forming the front portion in which is embedded a continuous metallic reinforcing member, and nose-bearing pads swingably mounted on pins which are rigid with said metallic reinforcing member. As a further variation of this embodiment, the reinforcing metallic member and the plastic material can be interrupted and screw connected in order to mount and lock in place both the glass and the hinge with the related glass arm.

I claim:

1. An eyeglass frame comprising:
   two substantially coextensive plates, sealed together to form a frame body and having a pair of spaced-apart windows adapted to receive lenses, at least one of the plates having a groove opening towards the other of said plates and closed thereby, said groove extending around said windows and across a bridge portion of the nose of the user and disposed between said windows;
   a generally flat reinforcing metallic strip member received in said groove so that the width of said strip member is transverse to planes of said plates, said frame body being provided with slots at opposite ends thereof opening into said windows opposite said bridge member, said slots each being defined by outwardly extending formations coplanar with said windows, said metallic member extending around respective windows and having ends bent outwardly along opposite sides of each of said slots and received in said formations;
   a respective temple having a hinge lug received in each slot; and
   a respective screw traversing a pair of said formations and the respective ends of said member and traversing each lug and holding the ends along the respective opposite sides of each slot together.

2. The eyeglass frame defined in claim 1 wherein said groove receiving said reinforcing member is at least open partially toward the interiors of said windows along the periphery thereof, further comprising an insert received in said groove for sealing same.

3. The eyeglass frame defined in claim 1 wherein the connection of said member to said plates at said bridge portion is such as to permit a slight sliding in order to not obstruct the expansion of the windows as lenses are mounted therein.

4. An eyeglass frame comprising:
   a generally planar frame body of plastic material forming the frame front portion and provided with lens-receiving windows and a nose-bridge member between said windows;
   a continuous generally flat metallic reinforcing strip member having a width greater than its thickness and received in said body and extending around said windows and in said nose-bridge member, said member having its width transverse to a plane of said frame body;
   headed pins being mounted on said reinforcing member in the region of said nose-bridge member and projecting from the plastic material of said body;
   nose-bearing pads swingably mounted on said pins, said frame body being provided with slots at opposite ends thereof opening into said windows opposite said bridge member, said metallic member having ends bent outwardly along opposite sides of each of said slots;
   a respective temple having a hinge lug received in each slot; and
   a respective screw in said plane traversing each lug and a pair of said ends flanking a respective slot and holding the ends along the respective opposite sides of each slot together.

5. The frame defined in claim 4 wherein said body is formed with a continuous groove receiving said reinforcing member.

* * * * *